Figure 1:
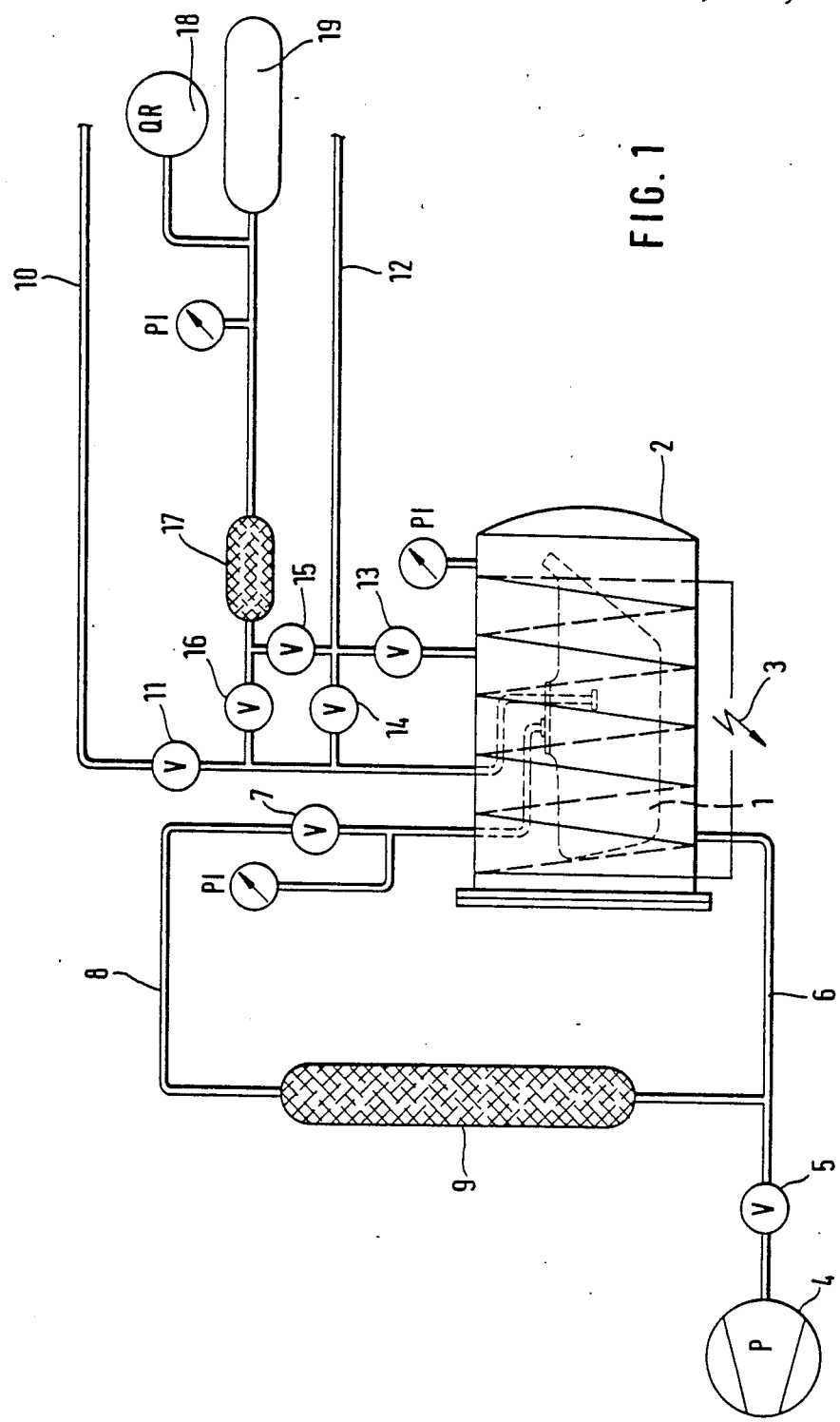

United States Patent [19]

Eschwey et al.

[11] Patent Number: 4,701,290
[45] Date of Patent: Oct. 20, 1987

[54] PROCESS FOR PREPARING FLUORIDATED SURFACES OF POLYMERS

[75] Inventors: Manfred Eschwey, Dusseldorf; Rolf van Bonn, Duisburg, both of Fed. Rep. of Germany

[73] Assignee: Mexxer Griesheim GmbH, Fed. Rep. of Germany

[21] Appl. No.: 839,194

[22] Filed: Mar. 13, 1986

[30] Foreign Application Priority Data

Mar. 30, 1985 [DE] Fed. Rep. of Germany ....... 3511743

[51] Int. Cl.$^4$ .................. B29C 41/08; C08F 8/18; C08F 8/20; C08F 8/22
[52] U.S. Cl. .................................. 264/40.1; 264/83; 264/85; 264/340; 427/248.1; 427/255.1; 427/255.6; 525/355; 525/356
[58] Field of Search ............ 264/40.1, 40.4, 82, 264/83, 85, 340; 427/248.1, 255.1, 255.6; 525/355, 356

[56] References Cited

U.S. PATENT DOCUMENTS

| | | | |
|---|---|---|---|
| 2,811,468 | 10/1957 | Joffre | 264/83 X |
| 3,758,450 | 9/1973 | Margrave et al. | 525/356 |
| 4,076,916 | 2/1978 | Lagow | 525/356 |
| 4,144,374 | 3/1979 | Lagow et al. | 525/356 X |

*Primary Examiner*—Jeffery Thurlow
*Assistant Examiner*—Leo B. Tentoni
*Attorney, Agent, or Firm*—Connolly & Hutz

[57] ABSTRACT

A process for preparing fluoridated surfaces of polymers includes exposing the surfaces for a period of time to the influence of a fluorine containing a treatment gas of defininte proportion for forming fluoridated hydrocarbons. A small portion of the treatment gas is drawn off during the exposure period and channeled via an activated aluminum oxide contact for carrying out the reaction $Al_2O_3 + 3F_2 \rightarrow 2AlF_3 + 3/2O_2$ to determine the fluorine concentration in the residual gas by means of quantitative determination of the released oxygen and therewith the degree of fluorine coating of the surface.

6 Claims, 2 Drawing Figures

PROCESS FOR PREPARING FLUORIDATED SURFACES OF POLYMERS

BACKGROUND OF THE INVENTION

In the automotive industry, fuel tanks of been increasingly made of polymers, especially polyethylene. These plastic fuel tanks are lighter and cheaper than the traditional ones made of sheet steel. Aside from this, they can be formed, without difficulty, into complex shapes so that the available space can be better utilized and the tank's volume can be increased.

Plastic fuel tanks are, however, not fully impermeable to fuel since small amounts of fuel constantly escape to the outside by permeation. There is, recently, a demand to substantially reduce the rate of permeation. This can be attained with good success by exposing the inner surface of the tank, for a period of time, to the influence of a fluorine containing treatment gas. The surface is, thereby coated with fluorine in the form of fluoridated carbon compounds and fluoridated hydrocarbons. This fluorine containing layer considerably reduces the rate of permeation. If one simultaneously uses the fluorine containing treatment gas as a blow medium during the blow extrusion of the fuel tank, one is referring to the so-called in-line-fluoridation. If, on the other hand, one applies the fluoridation to fully extruded fuel tanks, one refers to off-line-fluoridation. Such processes are, for example, known from German DE-PS 24 01 948 and DE-PS 26 44 508.

However, the fluoridation of plastic surfaces influences not only the permeation to a large degree, but also influences the abrasion resistance, the chemical, thermal and mechanical stability, the adhesion properties and the wettability. For this reason, the invention is not restricted to the inner surfaces of fuel tanks. The surface of the polymer is subjected to the attack of elementary fluorine during fluoridation. In the simplest case, as for example, polyethylene, the result is a stepwise radical substitution of the CH— bonds by CF— bonds.

As our own extensive experiments have shown, this results in fluoridated layers which are structured quite differently depending upon the conditions of the reaction. In order to obtain specific advantageous and uniquely reproducible surface effects for the above mentioned material behavior, it is of considerable importance that one adheres exactly to specific structure parameters of such a fluoridated surface. It is a question here, in the first place, of layer thickness, homogeneity of the fluorine coating, distribution of $CH_2$—, CHF— and $CF_2$— groups, and of the depth profile. Aside from this, the variable surface reactivity of many plastics, which varies from charge to charge must be considered. In order for specific fluoridated layers, selection and adherence to definite reaction conditions is of paramount importance. There is, however, no suitable process available for this, one makes do with empirical values obtained by experience.

SUMMARY OF THE INVENTION

The object of the invention is to achieve a process whereby it is possible to determine the degree of fluorine coating during the flow of the manufacturing process.

The quantitative determination of the freed oxygen required for the invention's process is state of the art and can be executed with high precision according to established methods. The continual execution of the inventive process is, as a rule, purposeful but not always required. It can be introduced with particular advantage during off-line fluoridation in the production of plastic fuel tanks.

It can, however, also be introduced in the on-line-fluoridation since the blow medium is likewise introduced in a definite amount for each fuel tank. With the reaction $Al_2O_3 + 3F_2 \rightarrow 2AlF_3 + 3/2O_2$ which is the basis of the invention, $\frac{1}{2}$ mole of oxygen is released per mole of fluorine. The oxygen is quantitatively determined by means of a commercial oxygen measuring device. The degree of fluorine coating can easily be measured during the course of the fabrication process via by the reduction in the fluorine concentration in the processing gas. When a certain level of fluorine transformation has been reached, the reaction is interrupted by flushing the reaction chamber with an inert gas or by evacuation. The process according to the invention permits the formation of very reproducible fluorine layers. One can, for the most part, waive the partially expensive direct and indirect supplementary testing procedures.

THE DRAWINGS

Figure 2:
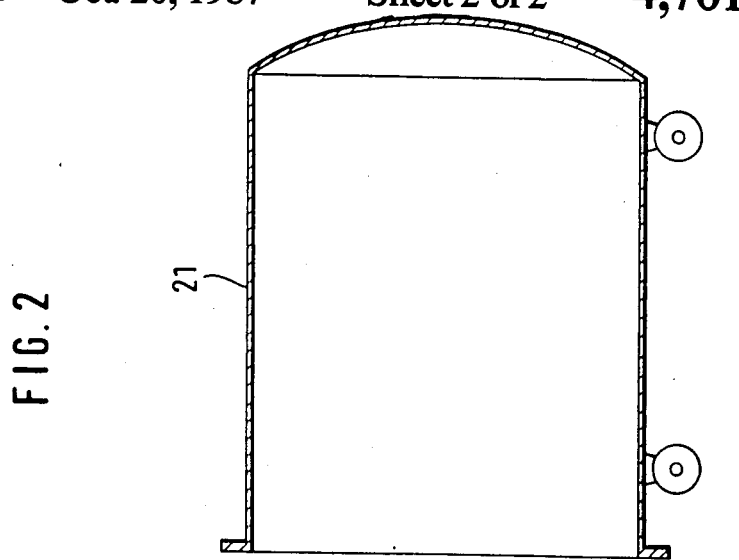
Figure 2:
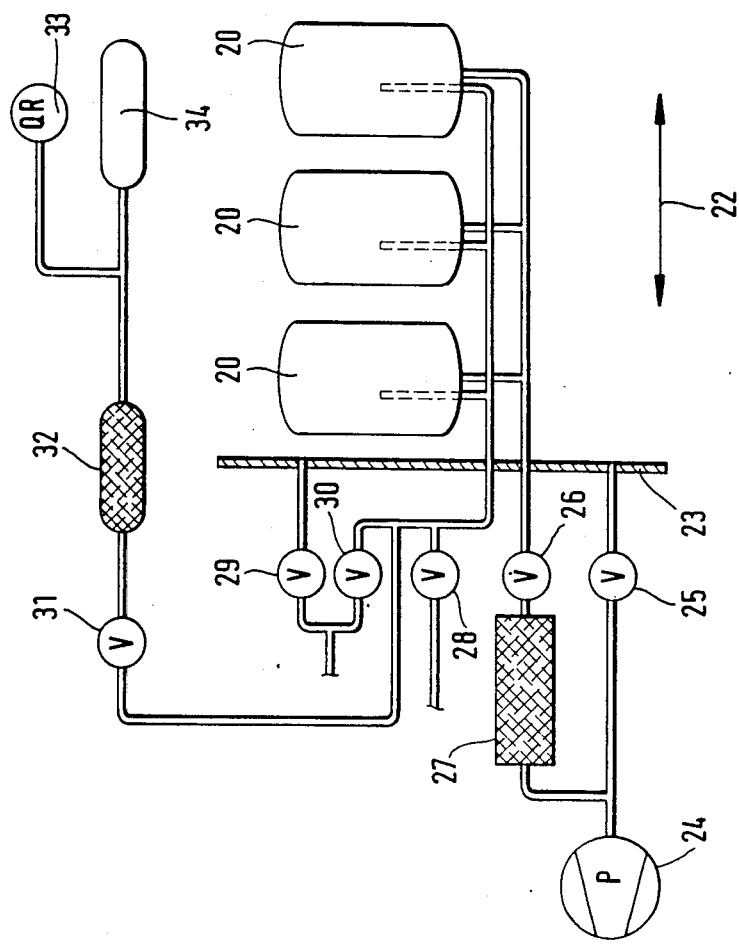

FIG. 1 is a schematic view of an assembly for practicing the process in the off-line-fluoridation of individual fuel tanks in accordance with this invention; and FIG. 2 illustrates the principle of the process with the simultaneous off-line-fluoridation of several fuel tanks.

DETAIL DESCRIPTION

According to the process depicted in FIG. 1, the plastic fuel tank 1 is in an evacuated pressure vessel 2, which can be kept at a temperature of between 20° and 80° C. by means of an electrical heating system 3.

In order to carry out the fluoridation, the pressure vessel 2 is first evacuated by means of the suction pump 4 via the valve 5 and the suction tube 6. With the valve 7 open, the plastic fuel tank is, hereby, simultaneously evacuated. After closing the valves 5 and 7, one allows the fluorine continuing treatment gas to flow into the plastic fuel tank 1 via the line 10 and the valve 11. As a result of this, a very even distribution of the fluorine onto the entire inner surface is attained. At the same time, one allows nitrogen to flow into the pressure vessel 2 via the line 12 and the valve 13. The valves 14, 15 and 16 are hereby closed. The pressure in the pressure vessel 2 can be adjusted independently of the pressure in the plastic fuel tank 1. The fluorine content in the treatment gas is, as a rule, 3 to 10% by volume. The pressure in the fuel tank 1, as a rule, 100 and 900 mbar. The treatment time is usually between 1 and 15 minutes.

A small portion of the treatment gas occurring in the plastic fuel tank 1 is constantly channeled, for the purpose of analyzing the residual fluorine content according to the invention, via the valve 16 and the aluminum oxide contact 17. The remaining valves are hereby closed. Since the treatment gas is under pressure and all valves but valve 16 are closed, the small portion of treatment gas flows under pressure through valve 16 to aluminum oxide contact 17. The reaction $Al_2O_3 + 3F_2 \rightarrow 2AlF_3 + 3/2O_2$ hereby occurs. For each mole of fluorine, one half a mole of oxygen is released. The quantitative determination of the generated oxygen takes place by means of the oxygen measuring device 18. The cylinder 19 serves to take gas samples for further analysis, for example, for determining the HF content. With the help of the invention's process, one can thereby, by means of the measurement of fluorine consumption, monitor and control the coating of the surface of the plastic fuel tank 1.

When the desired degree of reaction has been reached, the plastic fuel tank and 1 and the pressure vessel 2 are evacuated with the valves 5 and 7 open. Absorber 9 communicates with tank 1 through valve 7 and line 8. The gas mixture occurring in the plastic fuel tank 1 is thereby taken up in the adsorber 9 which holds the non-reacted fluorine and the reaction product hydrogen fluoride. The plastic fuel tank is then flushed with nitrogen via the line 12 and the valve 14 and subsequently evacuated. After that, no traces of hydrogen fluoride can be detected anymore in the plastic fuel tank 1. After the entire apparatus is ventilated, the permeation protected plastic fuel tank 1 can be removed.

FIG. 2 shows the application of the inventive process to the simultaneous fluoridation of several plastic fuel tanks 20 which are located in an appropriately large pressure vessel 21. The arrow 22 indicates that the pressure vessel 21 can be removed from the cover 23 loading and unloading plastic fuel tanks 20.

After the pressure vessel 21 is sealed by the cover 23, the heated plastic fuel tanks 20 are evacuated by means of the suction pump 24 with the valves 25 and 26 open. As soon as the desired end vacuum is reached, the fluorine containing treatment gas, a mixture of fluorine and nitrogen, is allowed to flow into the plastic fuel tanks 20 via the valve 28. At the same time, nitrogen is allowed to flow into the pressure vessel via the valve 29 in order to obtain a desired pressure there. After exhausting the treatment gas, the pressure vessel 21 and the plastic fuel tanks 20 are evacuated by means of the suction pump 24 via the valves 25 and 26. Unused fluorine and the reaction product hydrogen fluoride are, hereby, held fast at the adsorber 27. The plastic fuel tanks 20 are then flushed with nitrogen via the valve 30 and pumped empty (evacuated). After the apparatus has been ventilated, the permeation protected plastic fuel tanks 20 can be removed. Again, during the treatment period, a small amount of treatment gas is drawn off via the valve 31 and brought to reaction in the aluminum oxide contact 32. The oxygen which results from this is measured by the oxygen measuring device 33 while the cylinder 34 again serves to take samples for further analysis.

SUMMARY

Fuel tanks for automobiles are increasingly produced from polymers, especially polyethylene. In order to reduce the permeation of the fuel through the plastic, the inner surface of the tank is coated with fluorine in that one allows fluorine containing gas to act upon the surface for a certain amount of time. The fluorine hereby combines with hydrocarbons of the plastic. The degree of fluorine coating of the surface depends not only upon the time of exposure but rather upon a number of additional parameters. It is therefore desirable to control the degree of fluorine coating during the period of exposure. This is achieved in that one allows a defined amount of the treatment gas to act upon the surface and, preferably, channels a small amount of the treatment gas, on a continuous basis, via an activated aluminum oxide contact 17. The reaction $$Al_2O_3 + 3F_2 \rightarrow 2AlF_3 + 3/2O_2$$

thereby takes place. The oxygen content, which is easy to determine, is directly proportional to the currently available fluorine content in the treatment gas. The degree of fluorine coating during the course of the manufacturing process can, again, be determined.

What is claimed is:

1. In a process for preparing fluoridated surfaces of polymers wherein the surfaces are exposed for a period of time to the influence of a fluorine containing treatment gas of definite amount in a tank for the purpose of forming fluoridated carbon compounds and fluoridated hydrocarbons, the improvement being in that a small portion of the definite amount of the treatment gas is drawn off from the tank during the exposure period and channeled via an activated aluminum oxide contact for the purpose of carrying out the reaction $$Al_2O_3 + 3F_2 \rightarrow 2AlF_3 + 3/2O_2$$

in order to determine the concentration of fluorine in the gas remaining in the tank after the small portion has been drawn off by means of the quantitative determination of the released oxygen and therewith the degree of fluorine coating of the surface.

2. Process according to claim 1, characterized therein that the channeling of the drawn off treatment gas via the aluminum oxide contact and the determination of released oxygen take place continuously.

3. Process according to claim 2, characterized therein that the surfaces are the inner surfaces of plastic fuel tanks of polyethylene and that the amount of treatment gas is defined by the volume of the fuel tank.

4. Process according to claim 3, characterized therein that the process is carried out in the off-line-fluoridation of pre-fabricated extruded fuel tanks.

5. Process according to claim 1, characterized therein that the surfaces are the inner surfaces of plastic fuel tanks of polyethylene and that the amount of treatment gas is defined by the volume of the fuel tank.

6. Process according to claim 5, characterized therein that the process is carried out in the off-line-fluoridation of pre-fabricated extruded fuel tanks.

* * * * *